J. BLUM.
Scraping-Tool.
No. 196,623. Patented Oct. 30, 1877.
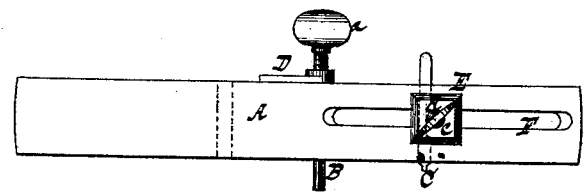
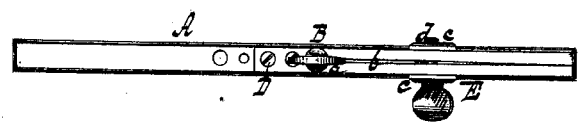
Witnesses.
Otto Hufeland
Hugo Brueggemann
Inventor.
Jacob Blum
by
Van Santvoord & Hauff
his attorneys.

UNITED STATES PATENT OFFICE.

JACOB BLUM, OF STAPLETON, NEW YORK.

IMPROVEMENT IN SCRAPING-TOOLS.

Specification forming part of Letters Patent No. 196,623, dated October 30, 1877; application filed April 25, 1877.

*To all whom it may concern:*

Be it known that I, JACOB BLUM, of Stapleton, in the county of Richmond and State of New York, have invented a new and Improved Scraping-Tool for Ornamenting Furniture and other Articles, which invention is fully set forth in the following specification, reference being had to the accompanying drawings, in which—

Figure 1 represents a side view of my improved tool. Fig. 2 is a top view thereof.

Similar letters indicate corresponding parts.

My invention has reference to a scraping-tool which is adapted to be used in ornamenting various articles of furniture, and also picture-frames, moldings, and other articles of wood, or of any other like soft material.

My invention consists in a handle constructed with two horizontal slots, one of which passes vertically through and the other horizontally through said handle, the latter having a gage-screw, in combination with a clamp passing through the horizontally-arranged slot, for confining a knife in the vertical slot, as more fully hereinafter set forth in detail, whereby, if the gage-screw is held against the edge of an article and is moved along such edge, an ornamental groove is formed in the surface of the article, parallel to its said edge, by the action of the knife or scraper.

In the drawings, the letter A designates the stock of my tool, forming, also, a handle, by which it is held when used. This stock or handle A is preferably made of wood which is slightly elastic, and it is provided with a slot, *b*, extending lengthwise thereof, for the reception of a scraper or knife, C, of suitable form, said slot *b*, moreover, extending through the stock or handle A in a vertical direction.

The letter B designates a gage, combined with the stock or handle A, and having the form of a screw-rod, which is passed through said stock or handle, the same being provided with a thumb-ear, *a*, at one end, and being also passed through a plate, D, which is secured to one of the surfaces of the stock or handle A.

The object of this plate D is to facilitate the setting of the gage B with respect to the ends of the stock or handle A.

E is a clamp by which the scraper or knife C is confined in the slot *b*. This clamp E is composed of two jam-nuts, *c c*, situated, respectively, on opposite sides of the stock or handle A, and of a screw-bolt, *d*, passing through the nuts *c c*, and through said stock or handle, the latter being provided with a longitudinal slot, F, which intersects the slot *b*, for the passage of said screw-bolt.

This slot F permits of moving the parts of the clamps E back and forth, and hence it can always be set adjacent to the scraper or knife C; but it may be remarked that the clamp E can be placed at some distance from the scraper C without losing its effect.

When the scraper or knife C has been adjusted in the desired position relatively to the gage B, the clamp E is tightened, and by this means the parts of the stock or handle A situated on each side of the slot *b* are compressed, and the scraper or knife C is firmly held in place.

By arranging the scraper or knife in the slot *b*, it is rendered adjustable not only with respect to the gage B, but also as to the length to which it is allowed to protrude from the slot *b*, and thereby I am enabled to vary the depth of the groove cut by my tool.

The method of using my tool is similar to a marking-gage—that is to say, the gage B is placed against the edge of a piece of furniture (as, for instance, a chair-back or any other article) in such a way as to bring the lower end or edge of the scraper or knife C in contact with the surface of the article, and then the whole is moved forward or backward, as the case may be, whereby an ornamental groove or rut is formed in said surface of the article parallel to its said edge, and at such a distance from the latter as the distance between the scraper or knife C and the gage B.

The grooves produced by my tool greatly enhance the appearance of an article, and their effect can be increased by filling them with metal leaf or bronze.

What I claim as new, and desire to secure by Letters Patent, is—

The handle A, constructed with the longitudinal slots $b$ and F, extending vertically and horizontally through the handle, and having the adjustable gage-screw B, passing through said handle, in combination with the adjustable clamp E, passing through the slot F, for confining a knife or scraper, C, in the slot $b$, substantially as and for the purpose described.

J. BLUM. [L. S.]

Witnesses:
  W. HAUFF,
  E. F. KASTENHUBER.